US012608228B2

(12) United States Patent
Yang

(10) Patent No.: US 12,608,228 B2
(45) Date of Patent: Apr. 21, 2026

(54) TASK PROCESSING SYSTEM AND TASK PROCESSING METHOD APPLICABLE TO INTELLIGENCE PROCESSING UNIT

(71) Applicant: SigmaStar Technology Ltd., Xiamen (CN)

(72) Inventor: Bo Yang, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 436 days.

(21) Appl. No.: 18/321,042

(22) Filed: May 22, 2023

(65) Prior Publication Data

US 2024/0134686 A1 Apr. 25, 2024
US 2024/0231899 A9 Jul. 11, 2024

(30) Foreign Application Priority Data

Oct. 20, 2022 (CN) .......................... 202211288142.3

(51) Int. Cl.
*G06F 9/48* (2006.01)
*G06F 9/30* (2018.01)
*G06F 9/4401* (2018.01)

(52) U.S. Cl.
CPC .......... *G06F 9/4881* (2013.01); *G06F 9/3004* (2013.01); *G06F 9/4418* (2013.01)

(58) Field of Classification Search
None
See application file for complete search history.

(56) References Cited

U.S. PATENT DOCUMENTS

| | | | | |
|---|---|---|---|---|
| 10,884,485 B2 * | 1/2021 | Honnavara-Prasad | ...................... G06N 3/0464 |
| 11,144,883 B2 * | 10/2021 | Krystek | .............. G06F 16/9537 |
| 11,495,037 B2 * | 11/2022 | Kim | .................... G06F 12/0207 |
| 11,782,870 B2 * | 10/2023 | Wang | .................... G06F 9/5066 712/29 |
| 11,789,895 B2 * | 10/2023 | Wang | .................... G06N 3/045 712/29 |
| 12,260,255 B2 * | 3/2025 | Wei | ........................ G06F 9/4887 |
| 2021/0073170 A1 * | 3/2021 | Liao | .................... G06F 15/7807 |
| 2023/0120227 A1 * | 4/2023 | Mital | .................... G06N 3/0464 706/26 |

OTHER PUBLICATIONS

Rjoub et al. "Cloud Task Scheduling based on Swarm Intelligence and Machine Learning", 2017 IEEE, pp. 272-279.*
George et al. "Determination of task scheduling mechanism using computational intelligence in Cloud Computing", 2015 IEEE, pp. 401-407.*

* cited by examiner

*Primary Examiner* — Van H Nguyen
(74) *Attorney, Agent, or Firm* — Edell, Shapiro & Finnan, LLC

(57) ABSTRACT

A task processing system includes an intelligence processing unit and an instruction processor. The instruction processor receives a task originated from a main processor and enables the intelligence processing unit in response to the task. The intelligence processing unit selects a corresponding firmware file from a plurality of firmware files according to the task and re-enables the instruction processor, such that the instruction processor operates the corresponding firmware file and cooperates with the instruction processor to complete the task.

12 Claims, 5 Drawing Sheets

400

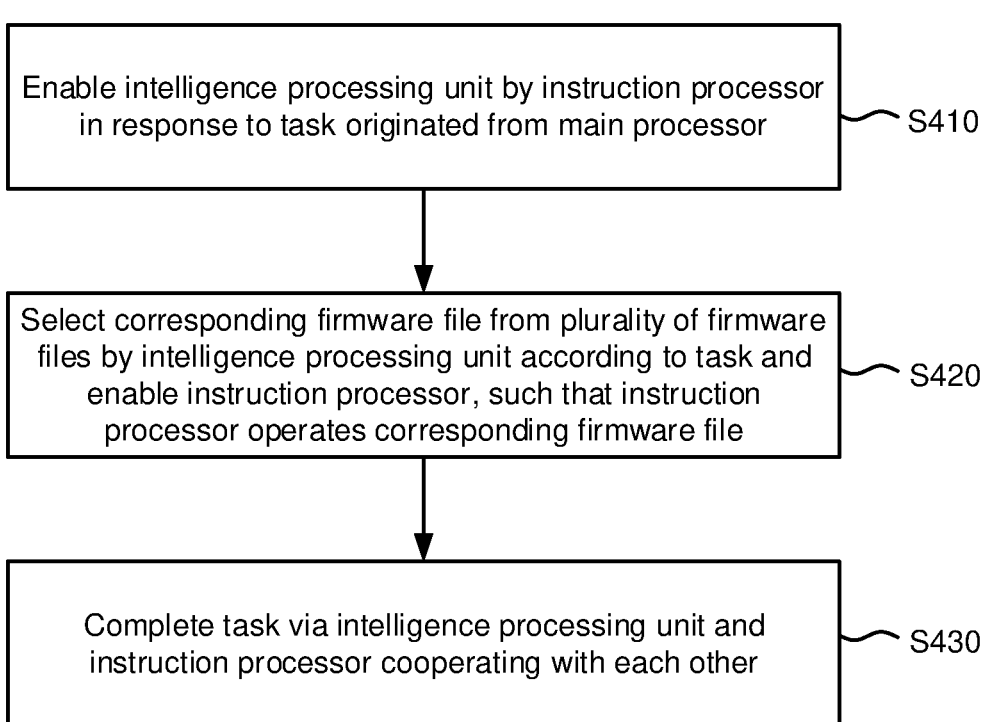

400

Enable intelligence processing unit by instruction processor in response to task originated from main processor ⟋ S410

Select corresponding firmware file from plurality of firmware files by intelligence processing unit according to task and enable instruction processor, such that instruction processor operates corresponding firmware file ⟋ S420

Complete task via intelligence processing unit and instruction processor cooperating with each other ⟋ S430

FIG. 4

TASK PROCESSING SYSTEM AND TASK PROCESSING METHOD APPLICABLE TO INTELLIGENCE PROCESSING UNIT

This application claims the benefit of China application Serial No. CN202211288142.3, filed on Oct. 20, 2022, the subject matter of which is incorporated herein by reference.

BACKGROUND OF THE INVENTION

Field of the Invention

The present application relates to a task scheduling mechanism of an intelligence processing unit, and more particularly to a task processing system and a task processing method applicable to an intelligence processing unit.

Description of the Related Art

In a conventional processing system, a task scheduling mode between an intelligence processing unit and a main processor in the system is conducted in a serial mode. For example, the main processor uses a kernel thread to assign multiple tasks to be executed, and notifies the intelligence processing unit to execute one of these tasks. The intelligence processing unit needs to report an execution result of the task to the kernel thread once executed one task. Upon receiving the execution result, the kernel thread then assigns the next task to the intelligence processing unit. In the above scheduling mode, if the workload of the main processor increases in a way that the response speed of the kernel thread slows down, latency in task scheduling of the intelligence processing unit occurs, hence significantly lengthening the overall time of operation.

SUMMARY OF THE INVENTION

In some embodiments, it is an object of the present application to provide a task processing system and a task processing method so as to improve the issues of the prior art.

In some embodiments, the task processing system includes a first intelligence processing unit and a first instruction processor. The first instruction processor receives a first task originated from a main processor and enables the first intelligence processing unit in response to the first task. The first intelligence processing unit selects a corresponding firmware file from a plurality of firmware files according to the first task and re-enables the first instruction processor, such that the first instruction processor operates the corresponding firmware file and cooperates with the first instruction processor to complete the first task.

In some embodiments, the task processing method includes the following operations: enabling an intelligence processing unit by an instruction processor in response to a task originated from a main processor; selecting a corresponding firmware file from a plurality of firmware files according to the task and re-enables the instruction processor by the intelligence processing unit, such that the instruction processor operates the corresponding firmware file; and the intelligence processing unit and the instruction processor cooperating with each other to complete the task.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

FIG. 4 is a flowchart of a task processing method according to some embodiments of the present application.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

Figure 1:
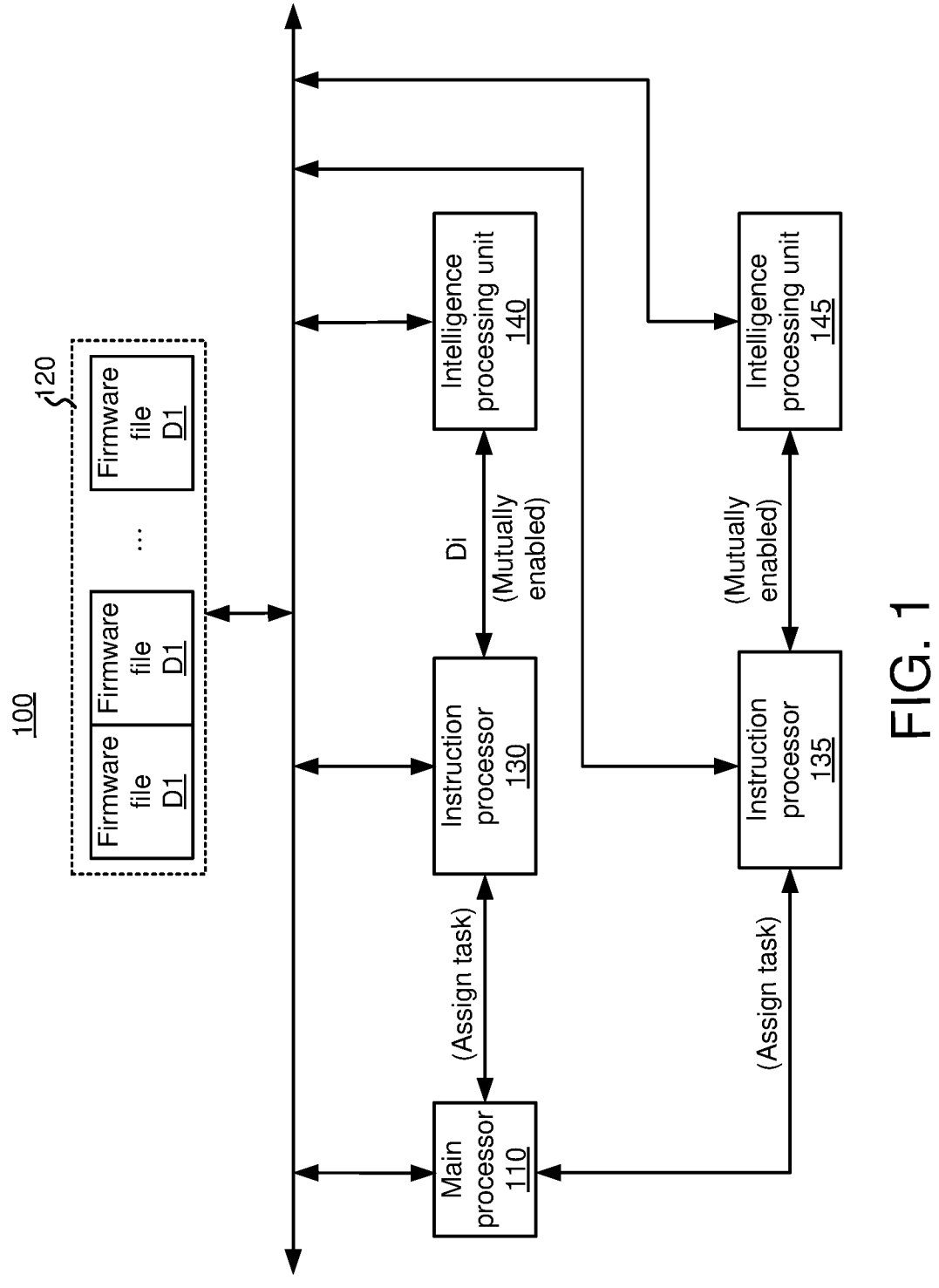
FIG. 1 is a schematic diagram of a task processing system according to some embodiments of the present application.

FIG. 1 shows a schematic diagram of a task processing system 100 according to some embodiments of the present application. In some embodiments, the task processing system 100 includes a main processor 110, a memory 120, an instruction processor 130, an instruction processor 135, an intelligence processing unit (IPU) 140 and an intelligence processing unit 145. The multiple hardware elements above may be coupled to one another by one or more buses or data lines.

The main processor 110 is a main processor in the task processing system 100, and has a higher computing power (as compared to the instruction processor 130 and/or the instruction processor 135). For example, the main processor 110 is capable of operating an operating system (for example but not limited to, Linux) on the task processing system 100.

In some embodiments, the memory 120 may be, for example but not limited to, a dynamic random access memory (DRAM). The memory 120 stores multiple firmware files D1 to DM. The intelligence processing unit 140 may select a corresponding firmware file (to be referred to as a firmware file Di below) from the multiple firmware files D1 to DM according to a task to be executed and transmit the firmware file Di to the instruction processor 130, for the instruction processor 130 to operate the firmware file Di. Thus, the instruction processor 130 may operate predetermined firmware (that is, firmware corresponding to the firmware file Di) to cooperate with the intelligence processing unit 140 to complete the task to be executed.

For example, the task to be executed is a computation performed by a predetermined neural network model, and a data format used for part of data is more suitably computed by the instruction processor 130 (as compared to using the intelligence processing unit 140). By analyzing related data describing the predetermined neural network model, the main processor 110 may determine the correspondence between the neural network model and at least one of the multiple firmware files D1 to DM, and accordingly determine the firmware file Di applicable for the task according to the correspondence. The main processor 110 may altogether transmit the related information above to a task queue (for example, a task queue TQ in FIG. 2B) in the instruction processor 130. As such, based on triggering of the instruction processor 130, the intelligence processing unit 140 may select the firmware file Di from the multiple firmware files D1 to DM according to the related information above. The intelligence processing unit 140 may transmit the firmware file Di to the instruction processor 130 and re-enable the instruction processor 130, such that the instruction processor 130 operates the firmware file Di. More specifically, the intelligence processing unit 140 acquires the firmware file Di from the memory 120, and transmits the acquired firmware file Di to the instruction processor 130. The above operation is similarly applicable for the instruction processor 135 and the intelligence processing unit 145, and such repeated details are omitted herein.

In some embodiments, each of the instruction processor 130 and the instruction processor 135 may be a reduced instruction set computer (RISC) processor. In some embodiments, each of the instruction processor 130 and the instruction processor 135 may be a processor based on open-source instruction set architecture (ISA). In some embodiments, each of the instruction processor 130 and the instruction processor 135 may be, for example but not limited to, a RISC-V processor. Each of the instruction processor 130 and the instruction processor 135 has a lower computing power (as compared to the main processor 110). For example, the instruction processor 130 and the instruction processor 135 do not execute the operating system of the task processing system 100, and are mainly in charge of receiving tasks that the main processor 110 assign to and are to be performed by the intelligence processing unit 140 and/or the intelligence processing unit 145, so as to further perform task scheduling of the intelligence processing unit 140 and/or the intelligence processing unit 145.

Each of the intelligence processing unit 140 and/or the intelligence processing unit 145 is a dedicated processor for performing artificial intelligence techniques, and may be used to process related applications and/or computations of a neural network (including, for example but not limited to, a convolutional neural network). As described above, the instruction processor 130 is used to handle task scheduling of the intelligence processing unit 140, and the instruction processor 135 is used to handle task scheduling of the intelligence processing unit 145. In other words, the instruction processor 130 is provided to correspond to the intelligence processing unit 140, and the instruction processor 135 is provided to correspond to the intelligence processing unit 145. In the embodiments of the present application, an instruction processor and an intelligence processing unit are in one-to-one correspondence. Related operation details of task scheduling are to be described with reference to FIG. 3A below.

In some embodiments, each of the intelligence processing units 140 and 145 may be a processing unit of a multi-core intelligence processing unit. Similarly, in some embodiments, each of the instruction processors 130 and 135 may be a processing unit of a RISC processor. It should be noted that the configuration details and/or types of the multiple instruction processors 130 and 135 and the multiple intelligence processing units 140 and 145 above are examples, and are not to be construed as limitation to the present application. Moreover, two instruction processors 130 and 135 and two intelligence processing unit 140 and 145 are depicted in FIG. 1 as examples; however, the present application is not limited to the examples. According to actual application requirements, the number of instruction processors and the number of intelligence processing units used in the task processing system 100 may be correspondingly modified.

Figure 2A:
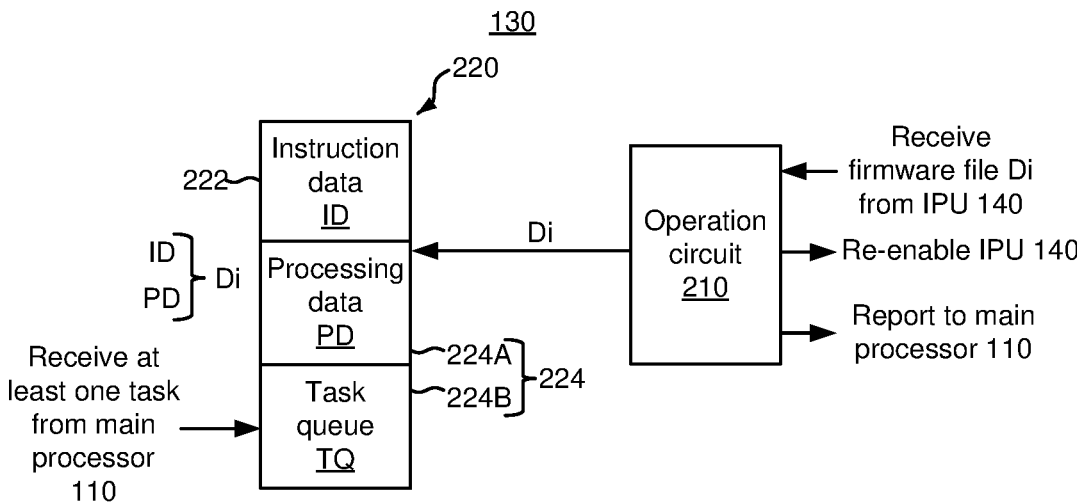
FIG. 2A is a schematic diagram of an instruction processor in FIG. 1 according to some embodiments of the present application.

FIG. 2A is a schematic diagram of the instruction processor 130 in FIG. 1 according to some embodiments of the present application. The instruction processor 130 and the instruction processor 135 are identically structured. Taking the instruction processor 130 for example, the instruction processor 130 includes an operation circuit 210 and a tightly coupled memory (TCM) circuit 220. As described with reference to FIG. 3A below, the operation circuit 210 may enable (or trigger) the intelligence processing unit 140 according to a corresponding task, and operate the firmware file Di transmitted by the intelligence processing unit 140 after the intelligence processing unit 140 is enabled so as to cooperate with the intelligence processing unit 140 to execute the corresponding task. Moreover, once the intelligence processing unit 140 reports that the task is completely executed, the operation circuit 210 reports to the main processor 110 that the task is completely executed.

The TCM circuit 220 may be used to store the firmware file Di and the task queue TQ, wherein the task queue TQ includes at least one first task assigned by the main processor 110. More specifically, the TCM circuit 220 includes an instruction tightly coupled memory (ITCM) 222 and a data tightly coupled memory (DTCM) 224. The ITCM 222 stores instruction data ID of the firmware file Di. The DTCM 224 includes a data region 224A and a data region 224B, wherein the data region 224A stores processing data PD of the firmware file Di and the data region 224B stores the task queue TQ. In general, the data transfer rate of the TCM circuit 220 is higher than the data transfer rate of the memory 120. Thus, compared to operating the firmware file Di on the memory 120, the operation circuit 210 may operate the firmware file Di in the TCM circuit 220 to achieve a faster processing speed. In some embodiments, the main processor 110 has the ability for writing data to the TCM circuit 220, and the main processor 110 may directly write task-related information to the task queue TQ in the TCM circuit 220 when a task is assigned, hence improving the efficiency of task assignment.

Figure 2B:
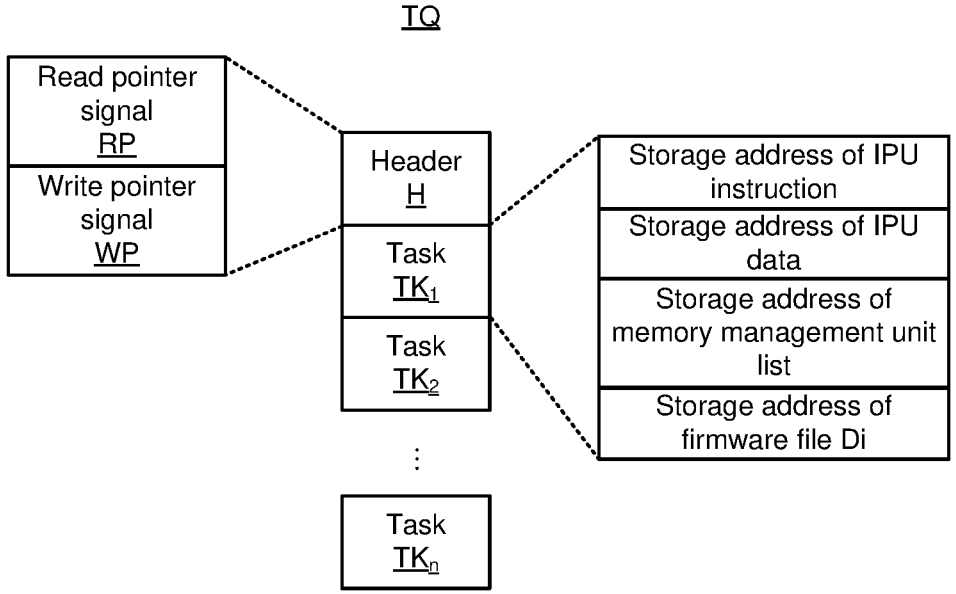
FIG. 2B is a schematic diagram of data of a task queue in FIG. 2A according to some embodiments of the present application.

FIG. 2B shows a schematic diagram of data of the task queue TQ in FIG. 2A according to some embodiments of the present application. In some embodiments, the task queue TQ may be used to indicate a processing order of multiple tasks. In some embodiments, the data region 224B may be implemented as a ring buffer that stores multiple sets of information of such as a header H and multiple tasks $TK_1$ to $TK_n$. The header H records a read pointer signal RP and a write pointer signal WP. The read pointer signal RP may indicate a starting position of multiple sets of valid data (that is, related information of the multiple tasks $TK_1$ to $TK_n$) stored in the storage region 224B, and the write pointer signal WP may indicate an ending position of the multiple sets of the valid data stored in the data region 224B. The main processor 110 may determine a remaining data capacity of the data region 224B according to a difference between the read pointer signal RP and the write pointer signal WP. For example, if the difference is smaller and is a positive number, it means that the data region 224B has a larger available capacity (that is, there is a smaller number of tasks to be processed).

In some embodiments, the main processor 110 may determine, according to a first difference (corresponding to the instruction processor 130) and a second difference (corresponding to the instruction processor 135), to assign a task to be processed to a task queue (for example, the task queue TQ in FIG. 2B) of the instruction processor 130 or to a task queue of the instruction processor 135, wherein the first difference refers to a difference determined by the read pointer signal RP and the write pointer signal WP of the instruction processor 130 and the second difference refers a difference determined by a read pointer signal and a write pointer signal of the instruction processor 135. For example, if the first difference corresponding to the instruction processor 130 is less than the second difference corresponding to the instruction processor 135, it means the task queue of the instruction processor 130 has a less number of tasks (as compared to the instruction processor 135). In this case, the main processor 110 may preferentially assign a task to be processed to be a first task scheduled by the instruction processor 130. Alternatively, if the second difference corresponding to the instruction processor 135 is less than the first difference corresponding to the instruction processor 130, it means that the task queue of the instruction processor 135 has a less number of tasks (as compared to the instruction processor 130). In this case, the main processor 110 may preferentially assign a task to be processed to be a second task scheduled by the instruction processor 135. Further, when the task processing system 100 includes multiple instruction processors and an intelligence processing unit, the main processor 110 compares the respective differences between the corresponding read pointer signals RP and write pointer signals WP of the instruction processors to assign tasks.

The related information of the multiple tasks $TK_1$ to $TK_n$ includes information written to multiple registers of the intelligence processing unit 140. Taking the task $TK_1$ for example, the related information of the task $TK_1$ may include, for example but not limited to, a storage address of an instruction (denoted as an IPU instruction) of the intelligence processing unit, a storage address of data (denoted as IPU data) of the intelligence processing unit, a storage address of a memory management unit list, and a storage address of the firmware file Di. In this embodiment, the above storage addresses refer to addresses in the memory; that is, the task processing system 100 or the main processor 110 stores in advance instructions and data related to the tasks in the memory 120, and include storage addresses of the related instructions and data in information of the tasks $TK_1$ to $TK_n$ when the tasks are assigned. When the operation circuit 210 reads the task $TK_1$ according to the read pointer signal RP, the operation circuit 210 may enable the intelligence processing unit 140 and write the related information of the task $TK_1$ to the intelligence processing unit 140.

As such, the intelligence processing unit 140 may acquire the storage address of the firmware file Di according to the storage address of the firmware file Di and acquire the firmware file Di from the memory 120, and acquire, according to other information, an instruction and data needed for executing the task $TK_1$. Thus, the intelligence processing unit 140 may perform the above operation to enable the instruction processor 130 so as to cooperate with the instruction processor 130 to complete related operations of the task $TK_1$.

Figure 3A:
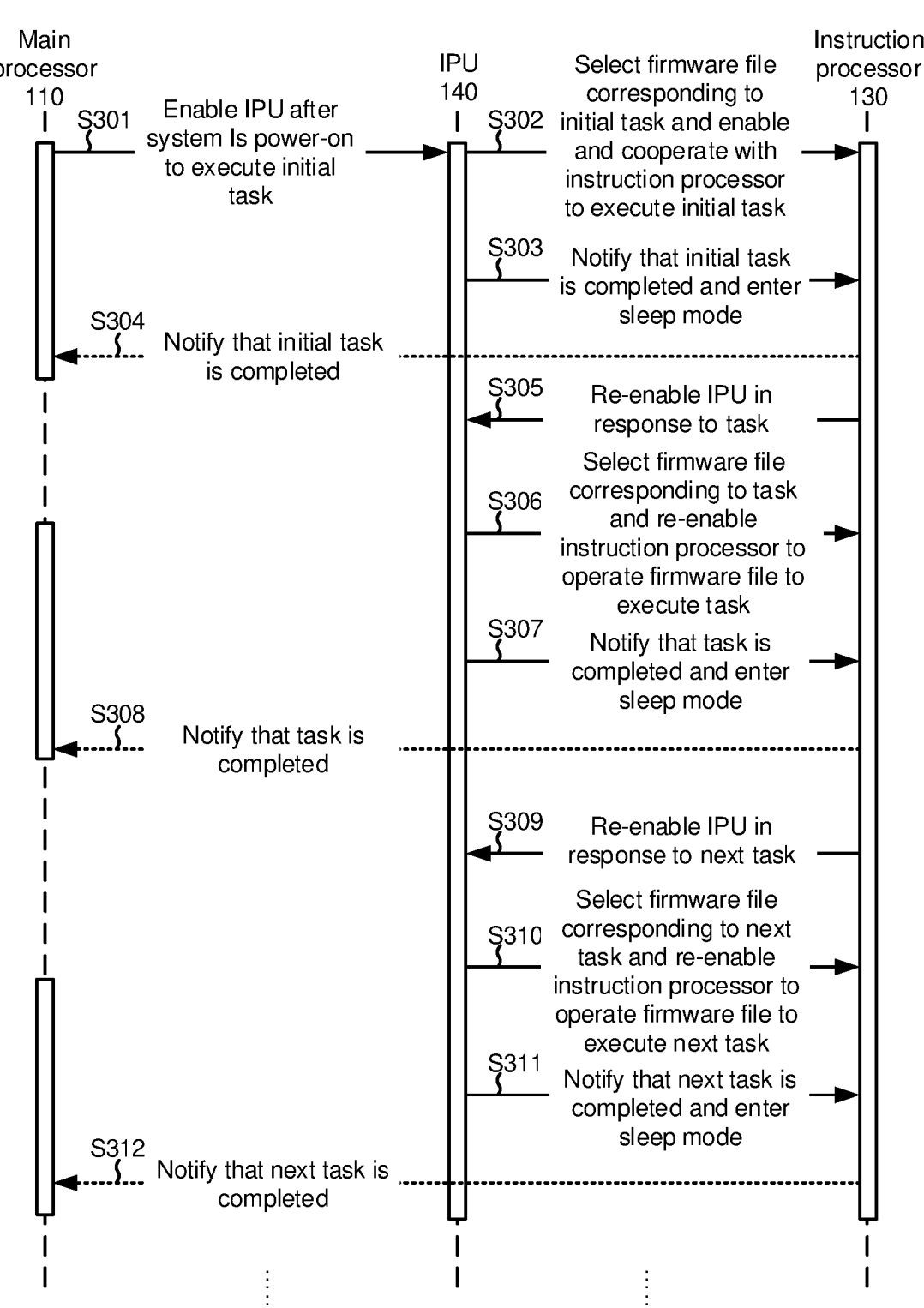
FIG. 3A is a schematic diagram of operation timings among a main processor, an intelligence processing unit and an instruction processor in FIG. 1 according to some embodiments of the present application.

FIG. 3A shows a schematic diagram of operation timings among the main processor 110, the intelligence processing unit 140 and the instruction processor 130 in FIG. 1 according to some embodiments of the present application.

In operation S301, the main processor 110 enables the intelligence processing unit 140 after system is power-on so as to execute an initial task. In operation S302, the intelligence processing unit 140 may select a firmware file corresponding to the initial task, and enable the instruction processor 130 so as to cooperatively execute the initial task. For example, after power-on of the task processing system 100, the main processor 110 may write task related information in response to the initial task issued by a software application in a user layer to a register of the intelligence processing unit 140 and enable the intelligence processing unit 140. The intelligence processing unit 140 may pick a corresponding firmware file (assuming it to be the firmware file D1) from the memory 120 according to the related information of the initial task. The intelligence processing unit 140 may transmit the firmware file D1 to the instruction processor 130 and enable the instruction processor 130, such that the instruction processor 130 operates the firmware file D1 to cooperate with the intelligence processing unit 140 to execute the initial task.

In operation S303, the intelligence processing unit 140 notifies the instruction processor 130 that the initial task is completed, and enters a sleep mode. In operation S304, the instruction processor 130 notifies the main processor 110 that the initial task is completed. For example, after the initial task is completely executed, the intelligence processing unit 140 may notify the instruction processor 130 by issuing an interrupt request that the initial task is completed. Similarly, after receiving the response from the intelligence processing unit 140, the instruction processor 130 may notify the main processor 110 by issuing an interrupt request that the initial task is completed. In some embodiments, the intelligence processing unit 140 enters a sleep mode each time when a task is completed so as to save power, wherein the sleep mode may be shutdown, a power-saving mode, a standby mode or other operation modes with lower power consumption. In some embodiments, the instruction processor 130 further feeds back an operation result to the main processor 110 after the task is executed.

In operation S305, the main processor 130 re-enables the intelligence processing unit 140 in response to a task. In operation S306, the intelligence processing unit 140 selects a firmware file corresponding to the task, and re-enables the instruction processor 130 to operate the firmware file so as to execute the task. For example, the instruction processor 130 may read, according to the task queue TQ (including one or more tasks assigned by the main processor 110) in FIG. 2B, a task (for example, the task $TK_1$) that is not yet executed, re-enable the intelligence processing unit 140 and transmit related information of the task $TK_1$ to the intelligence processing unit 140 (that is, writing task related information to the register of the intelligence processing unit 140). At this point, since the intelligence processing unit 140 is in a sleep mode, the re-enabling herein includes waking up the intelligence processing unit 140. In other words, in response to a task, the instruction processor 130 may re-enable the intelligence processing unit 140 in response to a task when an instruction from the main processor 110 is not received so as to execute the next task (for example, the task TK₁). The intelligence processing unit 140 may determine a firmware file (assuming it to be the firmware file D2) corresponding to the task TK₁ from the memory 120 according to the related information of the task TK₁. As such, the intelligence processing unit 140 may transmit the firmware file D2 to the instruction processor 130 and re-enable the instruction processor 130, such that the instruction processor 130 operates the firmware file D2 to cooperate with the intelligence processing unit 140 to execute the task TK₁. In some embodiments, the intelligence processing unit 140 may include a DMA circuit that is coupled to the memory 120 and the TCM circuit 220 in the instruction processor 130. The intelligence processing unit 140 may use the DMA circuit to write the firmware file D2 from the memory 120 to the TCM circuit 220 in the instruction processor 130. In operation S307, the intelligence processing unit 140 notifies the instruction processor 130 that the task (for example, the task TK₁) is completed, and enters a sleep mode. In operation S308, the instruction processor 130 notifies the main processor 110 that the task (for example, the task TK₁) is completed.

In the presence of a task not yet executed in the task queue TQ, operations S309 to S312 are performed, and details of operations S309 to S312 are similar to those of operations S305 to S308 and are omitted herein for brevity.

Similarly, it can be understood that, in some embodiments, in the initial task after power-on of the task processing system 100, the intelligence processing unit 140 is enabled by the main processor 110. In the subsequent operation process, the intelligence processing unit 140 is enabled by the instruction processor 130 to execute subsequent tasks. Moreover, during the process of task execution, the intelligence processing unit 140 and the instruction processor 130 are mutually enabled. After a task is completely executed each time, the intelligence processing unit 140 enters a sleep mode to reduce power consumption, until it is later re-enabled by the instruction processor 130. While each time a task is executed, the intelligence processing unit 140 selects an appropriate firmware file, transmits the firmware file to the instruction processor 130, and re-enables the instruction processor 130. The re-enabled instruction processor 130 may operate a firmware file stored in the TCM circuit 220 so as to cooperate with the intelligence processing unit 140 to complete the task. By selecting the corresponding firmware file for each task, each firmware file can be extremely simplified and at the same time satisfy requirements of the task, further reducing resources consumed when each time the instruction processor 130 executes the firmware file and lowering capacity requirements of the TCM circuit 220. During the above process of task scheduling, the main processor 110 releases a related kernel thread each time after assigning a task, and the intelligence processing unit 140 and the instruction 130 do not use the kernel thread of the main processor 110 when executing the task. Thus, dependency on the main processor 110 can be reduced, and the amount of load of the main processor 110 can also be decreased, thereby achieving a processing time with low latency.

FIG. 3A shows an example of using the main processor 110, the intelligence processing unit 140 and the instruction processor 130 for illustrations. The operation timings among the main processor 110, the intelligence processing unit 145 and the instruction processor 135 may be understood with reference to FIG. 3A, and such repeated details are omitted herein. In addition, the task processing system 100 is a parallel structure, and thus the operations between the intelligence processing unit 140 and the instruction processor 130 may be performed in parallel with the operations between the intelligent processing unit 145 and the instruction processor 135.

Figure 3B:
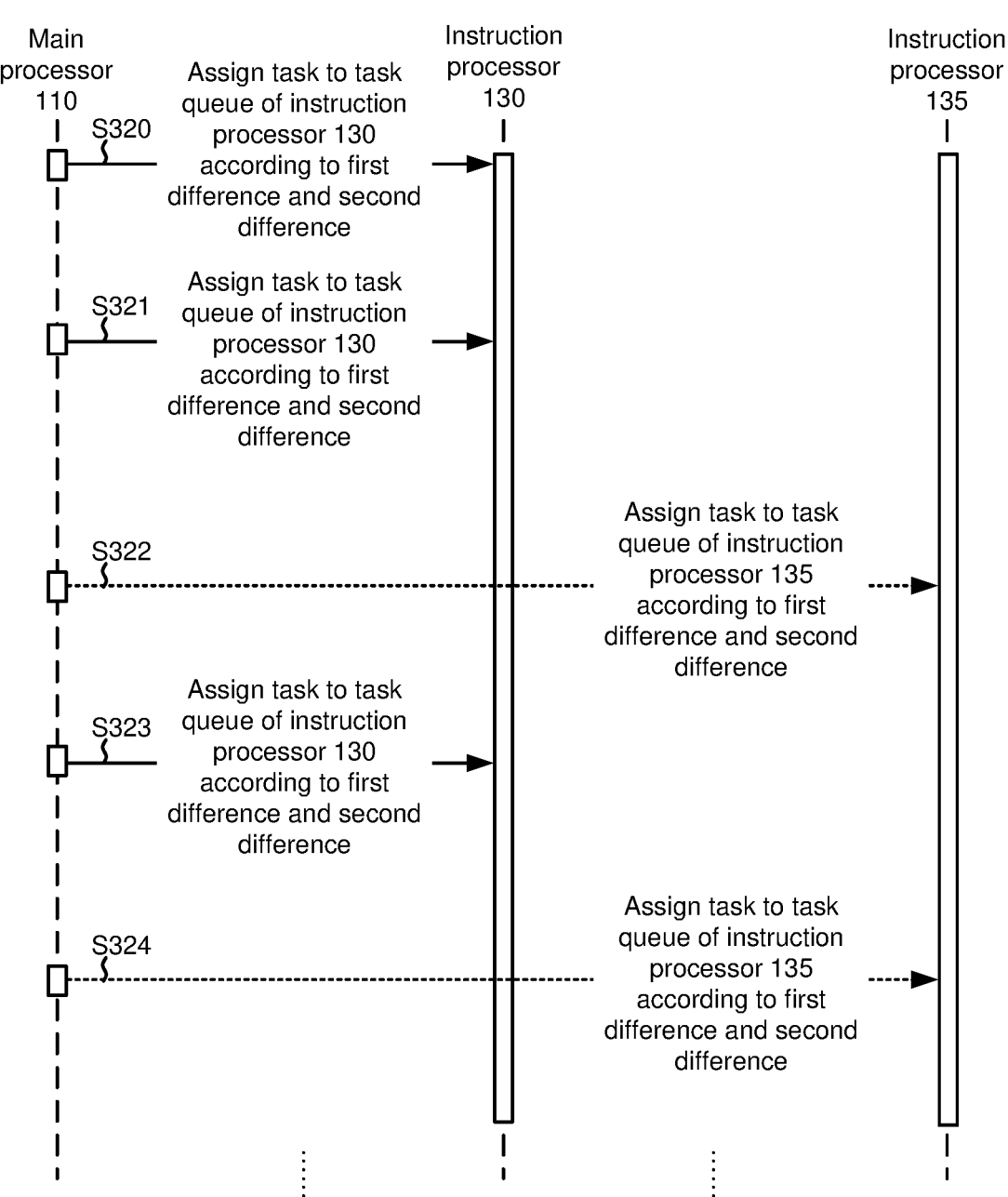
FIG. 3B is a schematic diagram of operation timings among a main processor and a plurality of instruction processors in FIG. 1 according to some embodiments of the present application.

FIG. 3B shows a schematic diagram of operation timings among the main processor 110, the instruction processor 130 and the instruction processor 135 in FIG. 1 according to some embodiments of the present application. As described above, the main processor 110 may determine, according to the first difference and the second difference, to assign a task to be executed to a task queue (for example, the task queue TQ in FIG. 2B) of the instruction processor 130 or to a task queue of the instruction processor 135. The first difference is determined by a difference between the read pointer signal RP and the write pointer signal WP (as shown in FIG. 2B) of the instruction processor 130. Similarly, the second difference is determined by a difference between the read pointer signal RP and the write pointer signal WP of the instruction processor 135.

In the example in FIG. 3B, assuming that the task queue of the instruction processor 135 is fuller, hence in operations S320 and S321, the main processor 110 may assign a task to the task queue of the intelligence processing unit 130 according to the first difference having a lower value. Then, in operation S322, the main processor 110 may assign a task to the task queue of the intelligence processing unit 135 according to the second difference having a lower value. Similarly, in operation S323, the main processor 110 may assign a task to the task queue of the intelligence processing unit 130 according to the first difference having a lower value. In operation S324, the main processor 110 may assign a task to the task queue of the intelligence processing unit 135 according to the second difference having a lower value. With the operations above, the main processor 110 may assign a new task to an instruction processor having a smaller number of tasks to be executed, so as to reduce the latency (or waiting) time in the overall operation.

In some embodiments, the operation timings in FIG. 3A may be performed in parallel with the operation timings in FIG. 3B. In other words, the operating timings of the instruction processor 130 receiving a task (that is, the timings in FIG. 3B) may be independent from the operation timings of the intelligence processing unit 140 performing a corresponding task (that is, the timings in FIG. 3A). More specifically, the intelligence processing unit 140 may execute a task to be executed according to the task queue TQ of the instruction processor 130, without having to rely on or wait for an instruction and/or a response from the main processor 110. Similarly, the main processor 110 may assign a task according to the first difference and the second difference described above, without having to rely on a response from the intelligence processing unit 140 and/or the intelligence processing unit 145. Thus, the main processor 110, and the intelligence processing 140 and/or the intelligence processing unit 145 are capable of independently performing respective operations, thereby improving the overall processing efficiency.

FIG. 4 shows a flowchart of a task processing method 400 according to some embodiments of the present application. In operation S410, an intelligence processing unit is enabled by an instruction processor in response to a task originated from a main processor. In operation S420, a corresponding firmware file is selected from a plurality of firmware files by the intelligence processing unit according to the task and the instruction processor is enabled, such that the instruction processor operates the corresponding firmware file. In operation S430, the intelligence processing unit and the instruction processor cooperate with each other to complete the task.

The details of the plurality of operations above may be referred from the description associated with the foregoing embodiments, and are omitted herein for brevity. The plurality operations of the task processing method 400 above are merely examples, and are not limited to being performed in the order specified in the examples. Without departing from the operation means and ranges of the various embodiments of the present application, additions, replacements, substitutions or omissions may be made to the operations of the task processing method 400, or the operations may be performed in different orders (for example, simultaneously performed or partially simultaneously performed).

In conclusion, the task processing system and the task processing method according to some embodiments of the present application are capable of implementing a system structure achieving parallel task scheduling and independently performing respectively operations by using instruction processors. Thus, the load of the main processor can be reduced and a task processing time with lower latency can be achieved to thereby improve the operation efficiency of the overall system.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. A task processing system, comprising:
a first intelligence processing unit;
a first instruction processor, receiving a first task originated from a main processor and enabling the first intelligence processing unit in response to the first task, wherein, the first intelligence processing unit selects a corresponding firmware file from a plurality of firmware files according to the first task and re-enables the first instruction processor, such that the first instruction processor operates the corresponding firmware file and cooperates with the first instruction processor to complete the first task, wherein information of the first task comprises a storage address of an instruction of the first intelligence processing unit in a memory and a storage address of the corresponding firmware file in the memory;
a second intelligence processing unit; and
a second instruction processor, receiving a second task originated from the main processor and enabling the second intelligence processing unit in response to the second task so as to execute the second task, wherein, the first instruction processor stores a first task queue comprising the first task, the second instruction processor stores a second task queue comprising the second task, the main processor determines, according to a first difference and a second difference, to write a task to be executed to the first task queue or the second task queue, the first difference is determined by a first read pointer signal and a first write pointer signal corresponding to the first instruction processor, and the second difference is determined by a second read pointer signal and a second write pointer signal corresponding to the second instruction processor.

2. The task processing system according to claim 1, wherein the first instruction processor comprises:
an operation circuit, enabling the first intelligence processing unit according to the first task, and operating the corresponding firmware file to cooperate with the first intelligence processing unit to execute the first task; and
a tightly coupled memory (TCM) circuit;
wherein, the first intelligence processing unit stores the corresponding firmware file in the TCM circuit.

3. The task processing system according to claim 1, wherein the first instruction processor comprises a tightly coupled memory (TCM) circuit, and the main processor stores information of the first task to the TCM circuit.

4. The task processing system according to claim 1, wherein the first intelligence processing unit is directly enabled by the main processor after the task processing system is powered on so as to execute an initial task, and the first intelligence processing unit is re-enabled by the first instruction processor after the initial task is executed.

5. The task processing system according to claim 1, wherein the first intelligence processing unit enters a sleep mode after the first intelligence processing unit executes the first task until being re-enabled by the first instruction processor.

6. The task processing system according to claim 1, wherein the first instruction processor does not occupy a kernel thread of the main processor when enabling the first intelligence processing unit.

7. The task processing system according to claim 1, wherein a computing power of the first instruction processor is lower than a computing power of the main processor.

8. The task processing system according to claim 1, wherein an operating system of the task processing system is executed by the main processor.

9. The task processing system according to claim 1, wherein the first instruction processor is a processor based on open-source instruction set architecture (ISA).

10. A task processing method, applicable to a processing system, the method comprising:
enabling a first intelligence processing unit by a first instruction processor in response to a first task originated from a main processor;
selecting a corresponding firmware file from a plurality of firmware files by the first intelligence processing unit according to the first task and re-enabling the first instruction processor, such that the first instruction processor operates the corresponding firmware file;
enabling a second intelligence processing unit by a second instruction processor in response to receiving a second task originated from the main processor and enabling the second intelligence processing unit in response to the second task so as to execute the second task, wherein, the first instruction processor stores a first task queue comprising the first task, the second instruction processor stores a second task queue comprising the second task, the main processor determines, according to a first difference and a second difference, to write a task to be executed to the first task queue or the second task queue, the first difference is determined by a first read pointer signal and a first write pointer signal corresponding to the first instruction processor, and the second difference is determined by a second read pointer signal and a second write pointer signal corresponding to the second instruction processor; and completing the first task via the first intelligence process-
ing unit and the first instruction processor cooperating
with each other, wherein information of the first task comprises a storage
address of an instruction of the first intelligence pro-
cessing unit in a memory and a storage address of the
corresponding firmware file in the memory.

11. The task processing method according to claim 10,
wherein the first intelligence processing unit stores the
corresponding firmware file to a tightly coupled memory
(TCM) circuit of the first instruction processor.

12. The task processing method according to claim 10,
wherein the main processor stores information of the first
task to a tightly coupled memory (TCM) circuit of the first
instruction processor.

\* \* \* \* \*